United States Patent [19]

Woditsch et al.

[11] 3,897,354

[45] July 29, 1975

[54] COBALT-CONTAINING ACICULAR FERRIMAGNETIC IRON OXIDE OF IMPROVED REMANENCE STABILITY

[75] Inventors: Peter Woditsch, Krefeld; Lutz Leitner, Rumeln-Kaldenhausen, both of Germany

[73] Assignee: Bayer Aktiengesellschaft, Leverkusen, Germany

[22] Filed: Apr. 12, 1973

[21] Appl. No.: 350,568

[30] Foreign Application Priority Data

Apr. 29, 1972 Germany .......................... 2221218

[52] U.S. Cl. .......................... 252/62.56; 252/62.56

[51] Int. Cl. . C01g 49/08; C04b 35/26; C04b 35/64

[58] Field of Search .......... 252/62.56, 62.55, 62.51, 252/62.57; 75/.5 AA

[56] References Cited

UNITED STATES PATENTS 3,573,980 4/1971 Haller et al. ................ 252/62.56 X

FOREIGN PATENTS OR APPLICATIONS 644,639 10/1950 United Kingdom ............. 252/62.56

*Primary Examiner*—Jack Cooper
*Assistant Examiner*—Eugene T. Wheelock
*Attorney, Agent, or Firm*—Burgess, Dinklage & Sprung

[57] ABSTRACT

In the production of acicular ferrimagnetic γ-iron oxide containing about 0.5 to 10 atom % of cobalt including the steps of producing cobalt-containing iron oxide hydroxide, dehydrating the oxide hydroxide to oxide, reducing the oxide and re-oxidizing it into ferrimagnetic iron oxide, the improvement which comprises tempering the material at a temperature of about 600° to 800°C prior to dehydration or reduction, whereby the resulting ferrimagnetic iron oxide upon being thermally stressed retains more than 90% of its remanence.

5 Claims, No Drawings

COBALT-CONTAINING ACICULAR FERRIMAGNETIC IRON OXIDE OF IMPROVED REMANENCE STABILITY

This invention relates to a process for the production of high coercive, cobalt-containing, acicular, ferrimagnetic iron oxides having improved properties which are suitable for storing high-frequency data without any excessive reduction in the original signal, even at elevated temperatures.

The iron oxides $Fe_3O_4$ and $\gamma$-$Fe_2O_3$, optionally doped with cobalt and other elements, are suitable for the production of magnetogram supports. The literature generally refers to ferromagnetic iron oxides in this respect. However, it has been known, at least since the works of L. Neel AN Phys., Paris 3, 137 (1948), were published, that the basic phenomenon responsible for the magnetic behavior differs from that in ferromagnetic materials and can be described as ferrimagnetic. The analogy between ferrimagnetism and ferromagnetism remains confined to the macroscopic behavior in the outer magnetic field.

In ferromagnetism, all the spin moments of the individual atoms are coupled and aligned in strict parallelism in individual regions, the so-called Weiss regions or domains. As a result, a resulting total moment is formed for each domain, corresponding to the sum of all the magnetic atom moments.

By contrast, ferrimagnetism is a special form of anti-ferromagnetism in which the spin moments of individual atoms are of equal intensity and are aligned in anti-parallelism. In ferrimagnetism, atom moments differing in their intensity act magnetically one against the other and thus produce a total moment of the elemental regions which, as in ferromagnetism, is different from zero. The atoms with oppositely directed spin occupy different crystal-lattice sites and form so-called sub-lattices. The resulting magnetic moment then no longer corresponds to the sum of all the atomic moments, but instead to the difference between the resulting magnetic moments of the individual sub-lattices.

In the case of magnetic iron oxides crystallizing in the spinel lattice, the sub-lattices are formed by the tetrahedral and octahedral vacancies of the cubically closest oxygen packing. The spin moments of all the ions on tetrahedral sites are coupled parallel to one another and, once again,, are aligned anti-parallel to the spin moments of the ions on octahedral sites which, in turn, are also sligned parallel to one another.

The resulting overall moment of the domains is derived from the difference between the magnetic moment of all the ions on octahedral sites and the magnetic moment of all the ions on tetrahedral sites. Thus, ferrimagnetism prevails in magnetic iron oxides. Accordingly, the magnetic iron oxide is characterized as ferrimagnetic rather than ferromagnetic in the present Application.

Recording materials of high coercive force are particularly suitable for recording and reproducing relatively high frequencies because they suppress the undesirable demagnetizing effect and enable the recording density to be increased. For this reason, highly coercive pigments have recently been sought for the development of video tapes and for improving dynamic range in sound tapes. The significance attached to an increase in coercive force can be seen from the fact that chromium dioxide, which is a relatively expensive substance, has been used and tested for certain purposes.

An increase in the coercive force of ferrimagnetic iron oxides is described at length in the literature and can be achieved by incorporating cobalt oxide into ferrimagnetic iron oxide. In a publication by I. R. Morrison and D. E. Speliotis on cobalt-containing iron oxides as a recording material of high recording density (IEEE-Transactions on Electronic Computers, EC 15, 782 et seq. (1966), it is pointed out that, by incorporating from 2 to 10 atom percent of cobalt into isometric iron oxides, it is possible to increase the coercive force from 100 to 900 Oe. However, the same work already refers to the dependence upon temperature of the coercive forces of cobalt-containing ferrimagnetic iron oxides, and quotes an example in which the coercive force falls from 5000 to 140 Oe when the temperature is increased during measurement from 77°K to 435°K. When used for magnetic recording purposes, this isometric cobalt-containing ferrimagnetic $\gamma$-iron oxide shows a drastic decrease in the original signal after increases in temperature during recording, storage or reproduction, and is therefore largely unsuitable for use as a magnetogram support. A similar decrease in the original signal is also produced through mechanical stressing in the event of repeated playing of sound or picture carriers with cobalt-containing iron oxides. Morrison developed a test for the mechanical and thermal instability of remanence and other magnetic parameters, by which it is possible to compare magnetic tapes with one another. The loss of residual magnetization of a tape heated for 30 minutes at 150°C can be taken as a measure of the quality of magnetic recording supsorts. The remanence loss which should be as low as possible is particularly large in cases where isometric cobalt-containing iron oxides are used. Remanence loss diminishes in the case of acicular cobalt-containing iron oxides although in this case there is less of an increase in coercive force when cobalt oxide is incorporated. After playing a tape at 76 cm per second, Morrison and Speliotis found a decrease of 55 % in the original signal in the case of cobalt-doped cubic $\gamma$-$Fe_2O_3$ and a decrease of 10 % in the case of acicular cobalt-doped $\gamma$-$Fe_2O_3$ after a total of 6000 playbacks. The authors concluded from this that cobalt-containing iron oxides are unsuitable for recording and reproducing sounds by conventional processes and can only be used for contact-free recording.

German Offenlegungschrift No. 1,907,236 describes an acicular cobalt-containing $\gamma$-$Fe_2O_3$ containing at least 0.25 % of cobalt, based on the total weight of the iron oxide, the particles, physically oriented in the tape direction, showing a "saturated remanence retention" in this direction of at least 80 % after they have been heated for 30 minutes at 150°C. According to German Offenlegungschrift No. 1,907,236, the thermal remanence retention is said to be increased and to pass through a maximum by an increasing content of incorporated iron (II) oxide.

However, in an industrial process it is difficult repeatedly to obtain a certain FeO-content which is essential for a uniform pigment quality with constant remanence loss. In addition, iron oxides containing FeO are sensitive to oxidation. Their sensitivity to oxidation increasess with decreasing particle size.

Cobalt-containing acicular iron oxides can be obtained by a number of processes. According to German Auslegeschrift No. 1,226,997, the $\gamma$-$Fe_2O_3$ can be doped with cobalt by producing the iron oxide hydroxide in the presence of a cobalt salt solution. In this process, an iron (II) salt solution is treated in the presence of a cobalt-(II) salt solution at a temperature of from 0° to 30°C by the addition of a basic precipitant up to a pH-value of from about 4.5 to 6.5, after which the resulting reaction mixture is treated with an oxidizing agent and the very fine particles of the cobalt-containing iron (III) oxide hydroxide thus produced are coarsened through further introduction of meterial in the same pH-range. The particles should be grown at pH-values within the range of about 4.5 to 6.5 and at temperatures of about 30° to 65°C and the addition of further salt solution and of the basically reacting substances should be controlled so that the cobalt-containing iron (III)-oxide hydroxide particles already present, under the effect of the oxidizing agent, reach a zise which enables acicular cobalt-containing $\gamma$-$Fe_2O_3$ having a needle width of 0.05 $\mu$m and a needle length of 0.5 $\mu$m to be obtained by dehydration, reduction and reoxidation in known manner. According to German Offenlegungschrift No. 1,907,236, another method of obtaining cobalt-containing acicular $\gamma$-$Fe_2O_3$ is to disperse $\gamma$-$Fe_2O_3$ or one of its precursor compounds in an aqueous medium and to precipitate a certain quantity of cobalt hydroxide on to the suspension.

German Offenlegungschrift No. 2,036,612 relates to a process for the production of acicular cobalt-containing $\gamma$-iron oxides for magnetogram supports by diffusing a cobalt compound adsorbed on $\gamma$-$Fe_2O_3$, $\alpha$-FeOOH or $Fe_3O_4$, and subsequently dehydrating, reducing and reoxidizing to produce the desired product.

There are other known processes for producing cobalt-containing acicular iron oxides. German Offenlegungschrift No. 2,100,390, describes the preparation of metal-oxide-containing $\gamma$-$Fe_2O_3$ by dispersing acicular FeOOH-particles as seed crystals in a cobalt- or nickel-containing iron (II) salt solution, precipitating the mixed hydroxides of the metals with an alkali hydroxide, oxidizing the precipitated metal to a higher valence state by adding a halogen-containing oxidizing agent, for example NaOCl, with the pH-value kept under control and converting the resulting Co- or Ni-containing iron oxide particles into acicular $\gamma$-$Fe_2O_3$ of the requisite size.

Another method of obtaining cobalt-containing acicular iron oxides is described in German Offenlegungschrift No. 2,022,013. Acicular FeOOH, $Fe_2O_3$ or $Fe_3O_4$ is mixed with a cobalt-containing liquid, the resulting sludge is dried and the mass is converted by conventional methods into $\gamma$-$Fe_2O_3$. The incorporation of cobalt into $\alpha$-FeOOH during preparation in a strongly alkaline medium is mentioned in German Auslegeschrift No. 1,204,644. In this process, doping of the $\alpha$-FeOOH with the requisite quantity of cobalt is particularly easy because all the cobalt is hydrolyzed at a pH-value above 8, with the result that complete precipitation takes place.

One feature common to all cobalt-containing acicular iron oxides, irrespective of which of the methods described above has been used for their production, is that, following conversion into $\gamma$-$Fe_2O_3$, their magnetic properties are both thermally and mechanically unstable.

The present invention provides a process for stabilising cobalt-containing ferrimagnetic iron oxides which is distinguished by the fact that cobalt-containing acicular iron (III) oxide hydroxide or oxide is tempered at a temperature of from about 600° to 800°C prior to reduction and reoxidation into ferrimagnetic iron oxide.

Although the cobalt-containing ferrimagnetic iron oxides obtained by the process according to the invention show somewhat reduced remanence in comparison with the untempered material, their remanence loss under thermal stressing is generally less than 10 %, while the remanence of untempered material decreases by more than 20 %, depending upon its cobalt-content. Accordingly, magnetic pigments are obtained having a remanence which is adequate for most applications and, in particular, having a remanence which is substantially constant. The ferrimagnetic cobalt-containing iron oxides are suitable for magnetic recording and reproduction in and on any materials such as, for example, tapes, discs, films, in printing inks and encoding substances. The process is unaffected by the quantity of cobalt incorporated and the method by which the Co-containing acicular iron oxide hydroxides have been produced. Irrespective of whether incorporation of the cobalt was actually carried out during production of the iron oxide hydroxides in their acid or alkaline medium or only through their subsequent coating with cobalt compounds of any kind, magnetic products having an improved remanence retention are obtained after tempering of the acicular cobalt-containing $\alpha$-$Fe_2O_3$ after its conversion into magnetic iron oxides by reduction into $Fe_3O_4$ optionally followed by reoxidation into $\gamma$-$Fe_2O_3$ in the usual way. During tempering the temperature can either fluctuate within the specified range or may be maintained at a constant level.

Tempering for 1 hour, particularly at temperatures of about 630° to 750°C, gives products which following conversion into $\gamma$-$Fe_2O_3$ are superior to the untempered cobalt-containing magnetic iron oxides. The upper limit to the tempering temperature is imposed by the increase in coarsening and by the sintering of the acicular cobalt-containing iron oxides. The tempering duration is also of considerable importance. Thus, temperatures of up to 800°C can readily be tolerated for very short periods. On the other hand, a tempering temperature of 750°C leads after only a few hours to heavy sintering and hence results in substantially unusable magnetic pigments. At temperatures below 600°C, the tempering times become so long that they no longer appear commercially worthwhile.

In cases where an iron oxide hydroxide having a certain cobalt oxide content is used as starting material, the remanence loss of the $\gamma$-$(Fe,Co)_2O_3$ produced from it decreases withh increasing tempering temperature of the dehydrated iron oxide hydroxide. In this case, the residual magnetization must not remain constant. It has even frequently been found that the remanence values of the magnetic powders before heating at 150°C are lower in the tempered products than in the untempered products. After the stability test, however, the samples tempered in the form of $\gamma$-$(Fe,Co)_2O_3$ show higher remanence values and greatly reduced remanence losses in comparison with untempered materials. Excessive sintering or coarsening of the cobalt-containing acicular iron oxides is reflected in a substantial decrease in remanence. Although these products then also show low remanence losses in the stability test, they are less suitable for magnetic recording supports.

Tempering itself is carried out in the presence of air in muffle furnaces, plate furnaces or cylindrical rotary kilns or in other suitable calcining furnaces. As already mentioned, the starting material can be produced by conventional processes. However, it is particularly suitable to use starting materials in which cobalt is already incorporated into the lattice of the FeOOH, as for example in the process according to German Auslegeschrift No. 1,226,997 or as in a hitherto unpublished process for the production of acicular ferromagnetic iron oxides from acicular iron oxide hydroxide by precipitating iron (II) hydroxide and/or carbonate from an aqueous iron (II) salt solution optionally containing modifiers by adding a stoichiometric excess of aqueous alkali hydroxide and/or alkali carbonate solutions, oxidizing the precipitation product to form iron oxide hydroxide, separating the oxidation product off from the reaction medium, and subsequently reducing and/or reoxidizing the iron oxide hydroxide into ferromagnetic iron oxide, in which at least the oxidation of the precipitated iron hydroxide and/or carbonate is partly carried out at temperatures of above 45°C to 75°C preferably at temperatures of from 50° to 60°C, the quantity of finely divided oxygen-containing gas per hour and volume in liters of the $Fe(OH)_2$-suspension being adjusted to a ratio of from 5 : 1 to 80 : 1, preferably from 10 : 1 to 60 : 1, and the intensity of stirring adjusted in such a way that the acicular iron oxide hydroxide accumulates in a volume-time yield of from 6 to 25 g/l/hour.

The process according to the invention is described in detail in the following Examples. The stability test is carried out on the powder.

The thermal instability of cobalt-containing iron oxides is discussed at length in German Offenlengungschrift No. 1,907,236. The decrease in remanence in the finished tape, as measured in the direction of magnetization and perpendicularly thereto, after heating for 30 minutes at 150°C, is taken as the criterion of stabilization. The remanence still present thereafter is known as the "saturated remanence retention" and is expressed in % of the initial value.

The remanence retention after 30 minutes at 150°C is split up into two fractions, a relatively large value corresponding to a low decrease in remanence in the magnetizing direction or in the tape direction, and a lower value, corresponding to a heavy decrease in remanence, perpendicularly thereto. This division cannot be made in measurements on the powder. Decreases in remanence measured on tape and powder are compared with one another in Table 1. The tapes were prepared in the usual way by introducing the cobalt-containing acicular $\gamma$-$Fe_2O_3$ together with the binder and solvent into a mill and casting the lacquer after grinding for 3.5 hours on to a 23 $\mu$m film to form oriented tapes having an iron oxide coating of 15 g/m$^2$.

Table 1

| Sample | Powder | Decrease in remanence in % Tape in the magnetizing direction | perpendicular | mean-value |
|---|---|---|---|---|
| 1 | 3.1 | 1.3 | 9.0 | 5.2 |
| 2 | 5.4 | 3.1 | 9.3 | 6.2 |
| 3 | 8.9 | 6.2 | 16.1 | 11.2 |
| 4 | 11.5 | 5.6 | 21.8 | 13.7 |
| 5 | 17.0 | 12.7 | 26.6 | 19.7 |
| 6 | 32.7 | 26.0 | 38.5 | 32.3 |

It can be seen from Table 1 that the mean remanence losses in the powder run parallel to the mean losses in the tape (arithmetic mean from remanence loss in tape direction and perpendicular thereto). Accordingly, remanence retention can also be measured on the powder.

The effectiveness of stabilization through the reduced decrease in remanence of powder samples after heating for 30 minutes at 150°C is demonstrated hereinbelow.

The cobalt-containing acicular iron oxide hydroxide was produced by the acid or alkaline method. In the acid methods, as described in German Auslegeschrift 1,226,997 or German Offenlegungschrift 1,592,398, using an iron cobalt salt solution, the $\alpha$-(Fe,Co)-OOH is produced by oxidizing an $Fe^{2+}$-salt solution with atmospheric oxygen or other oxidizing agents in the presence of $\alpha$-FeOOH-seeds and $Co^{2+}$-ions using basic precipitants or substances of the kind which liberate bases under the effect of protons, at a pH-value below 7.

The $\alpha$-FeOOH-seeds, which may also already contain Co, are obtained by precipitating iron (II) hydroxide from an iron (II) salt solution, optionally in the presence of dissolved Co-(II)-salts, and subsequently oxidizing with atmospheric oxygen. The degree of precipitation of the iron (II) ions during seed formation can fluctuate within the range from 20 to 90 %.

The hitherto unpublished process referred to hereinabove, results in acicular $\alpha$-(Fe,Co)-OOH in strongly alkaline medium.

In this case, all the iron and cobalt ions are precipitated as hydroxide from a cobalt-containing iron (II) salt solution with NaOH or $Na_2CO_3$ in stoichiometric excess, and converted into $\alpha$-(Fe,Co)-OOH by oxidation with atmospheric oxygen.

The effectiveness of the tempering process according to the invention is generally demonstrated in the following Examples by using cobalt-containing iron oxide hydroxides produced by various methods as the starting material.

EXAMPLE 1 a. Seed formation

In accordance with German Auslegeschrift No. 1,226,997, 3040 g of $FeSO_4$ and 346 g of $CoSO_4$ were dissolved in 20 liters of water and 915 g of commercial-grade NaOH in 2.5 liters of water were added to the resulting solution with stirring at 20° to 25°C. 100 liters of air per hour were introduced into the hydroxide suspension by means of a slotted-blade stirrer rotating at 1500 r.p.m., the temperature rising to 55°C over a period of 4 hours. During this period the pH-value fell from 7.6 to 5.0 and the color of the suspension changed from dark green through dark blue and green to orange-brown. The iron oxide hydroxide suspension (seed) formed then contained 50.2 g/l of $FeSO_4$ and 38.2 g/l of (Fe,Co)OOH. Accordingly, the degree of precipitation was 56.6 %.

b. Pigment formation 20 liters of the above seed suspension were heated to 60° – 70°C and 4.6 liters of a 12.65% NaOH solution were added with stirring over a period of 8 hours, 20 liters of air per hour were introduced at the same time as the NaOH. In this process, the seeds continued to grow at pH 4.5 to 6.5 through oxidation of the divalent metal ions to the trivalent stage, followed by hydrolysis. Following reduction of the (Fe,Co)-$SO_4$-concentration, a solution of Fe and Co-sulfate was simultaneously introduced together with the sodium hydroxide. 14.4 moles of $FeSO_4$ and 1.6 moles of $CoSO_4$ dissolved in 15.4 liters of water were added and 15.4 liters of an 8.3 % NaOH were introduced while bubbling in 30 l/h of air. Pigment formation was terminated after 8 hours and the cobalt-containing iron oxide hydroxide formed was filtered off, washed and dried at 130°C. The analytically determined Co-content was 5.95 atom %, the cobalt-containing α-FeOOH formed was acicular having a needle width of about 200 A (as measured by the X-ray method on the (011)-reflex of the α-FeOOH lattice) and with a length-to-width ratio of 5 : 1 to 30 :1 under supermicroscopic observation.

c. Conversion into $\gamma$-$(Fe,Co)_2O_3$

The (Fe,Co)-OOH was dehydrated by heating for 1 hour to 360°C. The pigment was then split up and converted either directly or after tempering. For tempering, the dehydrated cobalt-containing iron oxide was introduced into a trap-door furnace of the kind manufactured by Messrs. Heraeus, which had already been heated up to the required temperature, and then maintained at this temperature of 1 hour.

Conversion of the α-$(Fe,Co)_2O_3$ was carried out in the usual way with its needle form kept intact. $\gamma$-$(Fe,Co)_2O_3$ was heated under nitrogen to 400° – 460°C and then reduced for 30 minutes in a stream of hydrogen loaden with water vapor. Thereafter, the product was cooled to 200°C, still under hydrogen, rinsed with nitrogen and thereafter oxidized with air for approximately 45 minutes, for which purpose the temperature was gradually increased to 290°C.

d. The reduction of the remanence loss by the process according to the invention was shown in the following Table in which the same α-$(FeCo_2O_3$ was always used. The improved remanence retention, expressed as reduced remanence loss, was derived from the remanence measured on the powder before and after heating of the sample (30 minutes at 150°C).

| sample | tempering | Remanence (G cc.g$^{-1}$) before (°C) | after 30 mins at 150°C | remanence loss in % | coercive force (Oe) |
|---|---|---|---|---|---|
| 1 | untempered | 547 | 352 | 35.5 | 813 |
| 2 | 700 | 450 | 423 | 6.0 | 529 |

In this case, tempering for 1 hour at an elevated temperature was sufficient to give sintered and, hence, unusable products.

The reduced remanence loss obtained by the tempering process according to the invention was manifest. Thus, in the case of sample 2, there was only a loss of 6 % of the initial remanence of the powder as against a remanence loss of 35.5 % in the untempered pigment. This reduced remanence loss was composed of 2 fractions. On the one hand, the initial remanence was reduced while, on the other hand, the residual remanence after thermal stressing was also improved. The following applies as regards the second fraction: it passes through a maximum with increasing tempering temperature. Tempering of the cobalt-containing acicular α-$Fe_2O_3$ always involves a certain loss of coercive force following conversion into $\gamma$-$(Fe,Co)_2O_3$. Improved pigments having remanence losses of less than 6 % in the powder can be obtained by the process described herein even with the required coercive forces of from 500 to 600 Oe.

EXAMPLE 2 a. Seed formation

In a 30 liter reactor equipped with a slotted-blade stirrer, basic (Fe,Co)-sulfate was precipitated at 35°C from a 14.7 % solution containing 21.375 moles of $FeSO_4$ and 1.125 moles of $CoSO_4$, with 915 g of commercial-grade NaOH dissolved in 2.5 liters of water, and oxidized with 100 liters per hour of air with the stirrer rotating at 1500 r.p.m. The pH-value fell over a period of 4 hours from 7.6 to 4.2 and the temperature rose from 35° to 66°C. Seed formation was over when the initially blue-green suspension had become brownish yellow in color. It then contained 58 g/l of $(Fe,Co)SO_4$ and 38.3 g/l of (Fe,Co)-OOH, corresponding to an initial degree of precipitation of 53 %.

b. Pigment formation 22 liters of the seed suspension according to (a) were oxidized at 60° to 70°C by blowing in air at a rate of 20 liters per hour and stirring at 1500 r.p.m., and the trivalent ions formed were hydrolyzed by the addition of 126.5 g of NaOH in 1 liter of water over a period of 8 hours during which the pH-value was maintained between 4.2 and 5.2. The cobalt-containing iron oxide hydroxide formed had a needle width of about 230 A (as measured by X-ray photography on the (011)-reflex), a length-to-width ratio of from 5:1 to 30:1 according to supermicroscopic photographs and a Co-content of 3.2 atom %.

c. For the same degree of coarsening after conversion into $\gamma$-$(Fe,Co)_2O_3$ by reduction at 420°C and reoxidation at 290°C, the tempered iron oxide was considerably improved by comparison with the untempered iron oxide in regard to remanence loss.

| | remanence (Gcc.g$^{-1}$) before | after 30 mins. at 150°C | remanence loss % | coercive force (Oe) |
|---|---|---|---|---|
| untempered | 494 | 384 | 22.5 | 540 |
| tempered for 1 hour at 680°C | 476 | 408 | 14.5 | 513 |

EXAMPLE 3

9.4 liters of a solution containing 2350 g of $FeSO_4 \cdot 7 H_2O$ and 54.4 g of $CoCl_2 \cdot 6 H_2O$, were introduced into a 25 liter glass vessel. 1500 g of NaOH dissolved in 2.8 liters of water were then introduced into this solution with vigorous stirring at 50°C over a period of 3 minutes during which time air was simultaneously introduced at a rate of 250 l per hour. After 30 minutes further oxidation, the temperature was increased to 70°C and the introduction of air continued at a rate of 500 liters per hour until, after 6.5 hours, the reaction had ceased. After filtration, the product was washed free from alkali and then dried. Conversion of the acicular cobalt-containing α-FeOOH into cobalt-containing acicular $\gamma$-$Fe_2O_3$ gave the following magnetic data after tempering of the α-$(Fe,Co)_2O_3$ for 30 minutes at 700°C, reduction at 400°C and reoxidation with air at 260°C:

coercive force = 458 Oe;

remanence = 431 Gcc.$g^{-1}$; remanence loss (after 30 minutes at 150°C) = 9 % to 393 Gcc.$g^{-1}$.

EXAMPLE 4 a. Seed formation 6.2 kg of $FeSO_4 . 7 H_2O$ were dissolved in 19.8 liters of water, followed by the addition at 50°C of 920 g of NaOH in 2.5 liters of water in a 30-liter reaction vessel. The basic iron sulfate precipitated was oxidized with 1750 litres of air per hour into acicular finely divided $\alpha$-FeOOH over a period of 65 minutes using a stirrer rotating at 1500 r.p.m. The pH-value fell from 7.4 to 3.6. The seed formed contained 60.2 g/l of $FeSO_4$ and 41.8 g/l of FeOOH, so that the degree of precipitation was 54.2%.

b. Pigment formation 21 liters of the seed prepared as described above were heated to 80°C and the remaining $FeSO_4$ still present in the seed was oxidized with air (500 l/h) and hydrolyzed as uniformly as possible with a 19 % sodium hydroxide solution. The pH-value rose to 7.0 over a period of 6.75 hours.

c. 71.8 g of $CoSO_4 . 7 H_2O$ dissolved in 0.3 liters of water were added at 80°C and pH-3.5 to 736 g of FeOOH prepared in accordance with (b) in a reactor. While air was blown in at a rate of 500 liters per hour, the pH-value was increased with dilute NaOH to 8 – 9 over a period of an hour so that all the cobalt is precipitated as cobalt hydroxide. The washed and dried pigment contained 3.2 atom % of Co and had a needle width of 260 A as determined by X-ray photography. Supermicroscopic photographs showed a length-to-width ratio of 5 : 1 to 30 : 1.

The $\gamma$-$(Fe,Co)_2O_3$ obtained therefrom, tempered for 1 hour at 720°C in the form of $\alpha$-$(Fe,Co)_2O_3$, only showed a remanence loss of 9 % for a Br/$\rho$-value of 406 Gcc.$g^{-1}$ after 30 minutes at 150°C.

As employed herein, the atom % of cobalt refers to the % cobalt atoms based on the total of Fe and Co atoms in the material referred to.

The products produced in accordance with the invention, in addition to their high remanence retentions, also exhibit high coercitivities, usually exceeding about 450 Oe and often exceeding 530 Oe.

It will be appreciated that the instant specification and examples are set forth by way of illustration and not limitation, and that various modifications and changes may be made without departing from the spirit and scope of the present invention.

What is claimed is:

1. In the production of acicular ferrimagnetic material consisting essentially of $\gamma$-iron oxide and about 0.5 to 10 atom % of cobalt including the steps of producing cobalt-containing iron oxide hydroxide, dehydrating the oxide hydroxide to oxide, reducing the oxide and re-oxidizing it into ferrimagnetic iron oxide, the improvement which comprises tempering the material in air at a temperature of about 600° to 800°C prior to reduction for a time such that the ferrimagnetic iron oxide exhibits increased remenence stability compared with untempered oxide.

2. The process of claim 1 wherein tempering is effected at about 630° to 750°C for about 1 hour.

3. The process of claim 1 wherein the cobalt-containing iron oxide hydroxide is produced by acidifying a basic cobalt-containing iron sulfate or chloride solution to a pH of about 4.5 to 6.5 to form a precipitate, oxidizing the precipitate to form $\alpha$-(Fe,Co)-OOH seed crystals, and oxidizing further solution in the presence of such seed crystals, whereby further $\alpha$-(Fe,Co)-OOH precipitates.

4. The process of claim 1 wherein the cobalt-containing iron oxide hydroxide is produced by adding to a cobalt-containing iron (II) salt solution at a pH above about 9 a stoichiometric excess of an alkali metal hydroxide or carbonate thereby to precipitate (Fe,Co)-hydroxides, and oxidizing the hydroxides to produce $\alpha$-(Fe,Co)-OOH.

5. The process of claim 1 wherein the cobalt-containing iron oxide hydroxide is produced by contacting solid iron oxide or iron oxide hydroxide with a cobalt-containing liquid thereby to deposit cobalt-containing compound on the iron oxide or iron oxide hydroxide, and separating the solids.

* * * * *